(12) United States Patent
Raghavan et al.

(10) Patent No.: US 9,363,683 B2
(45) Date of Patent: Jun. 7, 2016

(54) ASYMMETRIC CAPABILITY-DRIVEN METHODS FOR BEAM TRACKING IN MM-WAVE ACCESS SYSTEMS

(71) Applicant: QUALCOMM Incorporated, San Diego, CA (US)

(72) Inventors: Vasanthan Raghavan, North Brunswick, NJ (US); Sundar Subramanian, Bridgewater, NJ (US); Ashwin Sampath, Skillman, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 64 days.

(21) Appl. No.: 14/332,330

(22) Filed: Jul. 15, 2014

(65) Prior Publication Data

US 2016/0021548 A1 Jan. 21, 2016

(51) Int. Cl.
*H04W 16/28* (2009.01)
*H04W 76/02* (2009.01)
*H04B 7/04* (2006.01)
*H04B 7/06* (2006.01)
*H04B 7/08* (2006.01)

(52) U.S. Cl.
CPC ............... *H04W 16/28* (2013.01); *H04B 7/046* (2013.01); *H04B 7/0617* (2013.01); *H04B 7/0628* (2013.01); *H04B 7/0695* (2013.01); *H04B 7/088* (2013.01); *H04W 76/02* (2013.01)

(58) Field of Classification Search
None
See application file for complete search history.

(56) References Cited

U.S. PATENT DOCUMENTS

| 8,248,303 | B2 | 8/2012 | Maruhashi et al. | |
|---|---|---|---|---|
| 2009/0231196 | A1* | 9/2009 | Niu | H01Q 3/26 342/372 |
| 2011/0002373 | A1* | 1/2011 | Jeon | H04B 7/043 375/228 |
| 2012/0092217 | A1* | 4/2012 | Hosoya | H01Q 3/267 342/373 |
| 2013/0045690 | A1* | 2/2013 | Seol | H04B 7/0417 455/63.4 |
| 2013/0155907 | A1* | 6/2013 | Soffer | H01Q 3/26 370/255 |
| 2013/0201938 | A1* | 8/2013 | Seol | H04W 72/1284 370/329 |
| 2013/0272263 | A1* | 10/2013 | Pi | H04W 72/042 370/330 |

(Continued)

FOREIGN PATENT DOCUMENTS

| WO | 2013025070 A2 | 2/2013 |
|---|---|---|
| WO | 2014018052 A1 | 1/2014 |

OTHER PUBLICATIONS

International Search Report and Written Opinion—PCT/US2015/037009—ISA/EPO—Sep. 8, 2015.

*Primary Examiner* — Robert C Scheibel
(74) *Attorney, Agent, or Firm* — Arent Fox LLP

(57) ABSTRACT

A method, an apparatus, and a computer program product for operating a user equipment (UE) are provided. The apparatus establishes a wireless communication link with a millimeter-wave base station (mm W-BS) based on a transmit beam from the mm W-BS. The transmit beam has a transmit beam direction. In addition, the apparatus receives beamforming capability information indicating one of at least a digital, analog, or hybrid beamforming capability associated with the mm W-BS. Further, the apparatus scans N transmit beams from the mm W-BS for each of M receive beam directions of the UE based on the beamforming capability information and the transmit beam associated with the wireless communication link.

28 Claims, 9 Drawing Sheets

(56) References Cited

U.S. PATENT DOCUMENTS

| | | | |
|---|---|---|---|
| 2013/0301454 A1* | 11/2013 | Seol | H04B 7/043 370/252 |
| 2014/0073337 A1* | 3/2014 | Hong | H04W 16/28 455/452.1 |
| 2014/0098912 A1* | 4/2014 | Yin | H04B 7/0417 375/345 |
| 2014/0204902 A1* | 7/2014 | Maltsev | H04W 36/0083 370/331 |
| 2015/0004918 A1* | 1/2015 | Wang | H04W 88/02 455/73 |
| 2015/0215077 A1* | 7/2015 | Ratasuk | H04B 7/0623 455/436 |
| 2015/0230263 A1* | 8/2015 | Roy | H04W 36/0083 455/452.2 |
| 2015/0244071 A1* | 8/2015 | Shirakata | H04W 24/08 342/368 |
| 2015/0257073 A1* | 9/2015 | Park | H04W 36/30 370/331 |

\* cited by examiner

ASYMMETRIC CAPABILITY-DRIVEN METHODS FOR BEAM TRACKING IN MM-WAVE ACCESS SYSTEMS

BACKGROUND

1. Field

The present disclosure relates generally to communication systems, and more particularly, to asymmetric capability-driven methods for beam tracking in millimeter wave (mmW) access systems.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus establishes a wireless communication link with a millimeter-wave base station (mmW-BS) based on a transmit beam from the mmW-BS, the transmit beam having a transmit beam direction, receives beamforming capability information indicating one of at least a digital, analog, or hybrid beamforming capability associated with the mmW-BS, and scans N transmit beams from the mmW-BS for each of M receive beam directions of the UE based on the beamforming capability information and the transmit beam associated with the wireless communication link.

DETAILED DESCRIPTION

Figure 1:
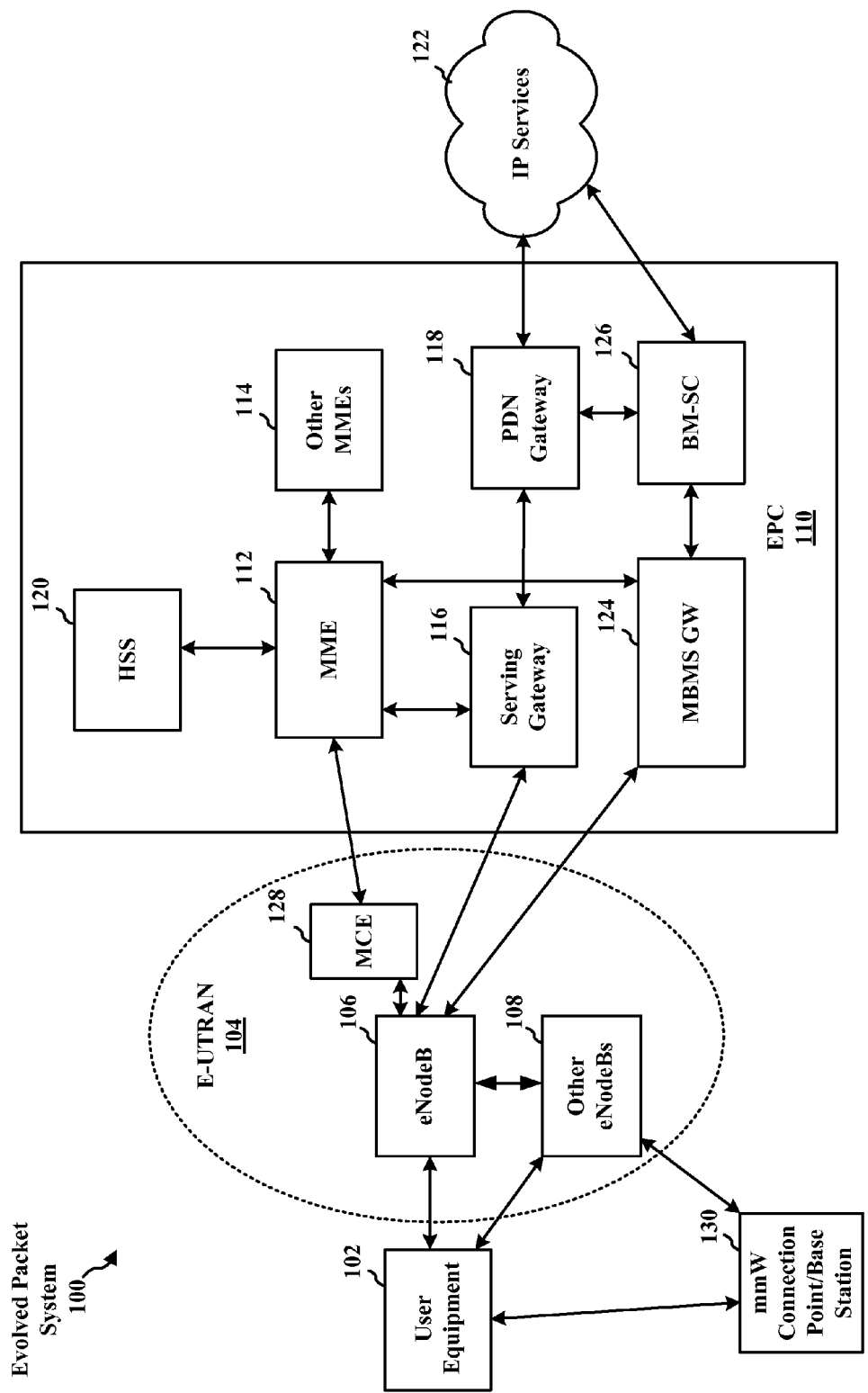
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) or mmW base station (mmW-BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS/mmW-BS 130 may be capable of communicating signals via the LTE network and the mmW system. As such, the CP/BS/mmW-BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link.

Figure 2:
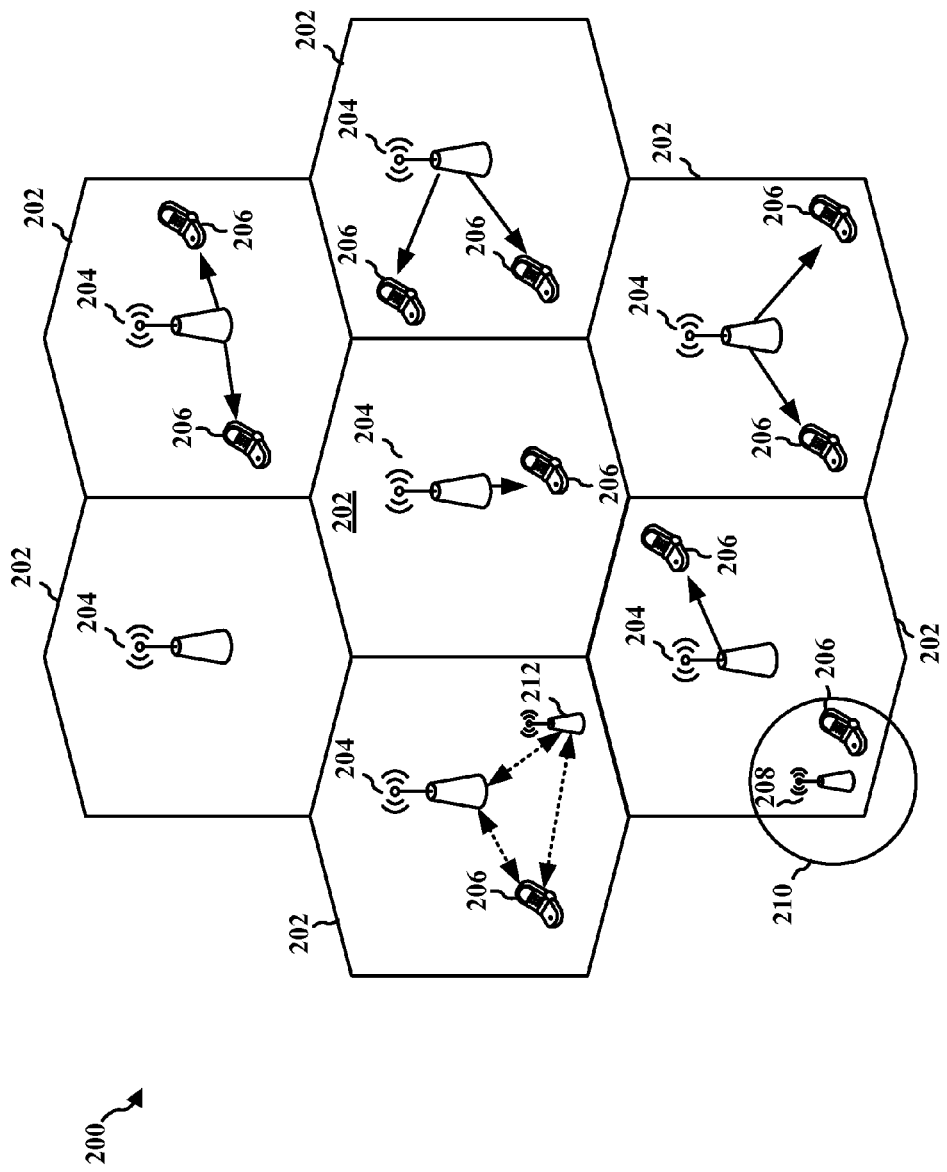
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS/mmW-BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS/mmW-BS 212 is capable of LTE network communication). In yet another aspect, the eNB 204 communicates signals via the LTE network and the mmW system, while the CP/BS/mmW-BS 212 communicates signals via the mmW system only. Accordingly, the CP/BS/mmW-BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
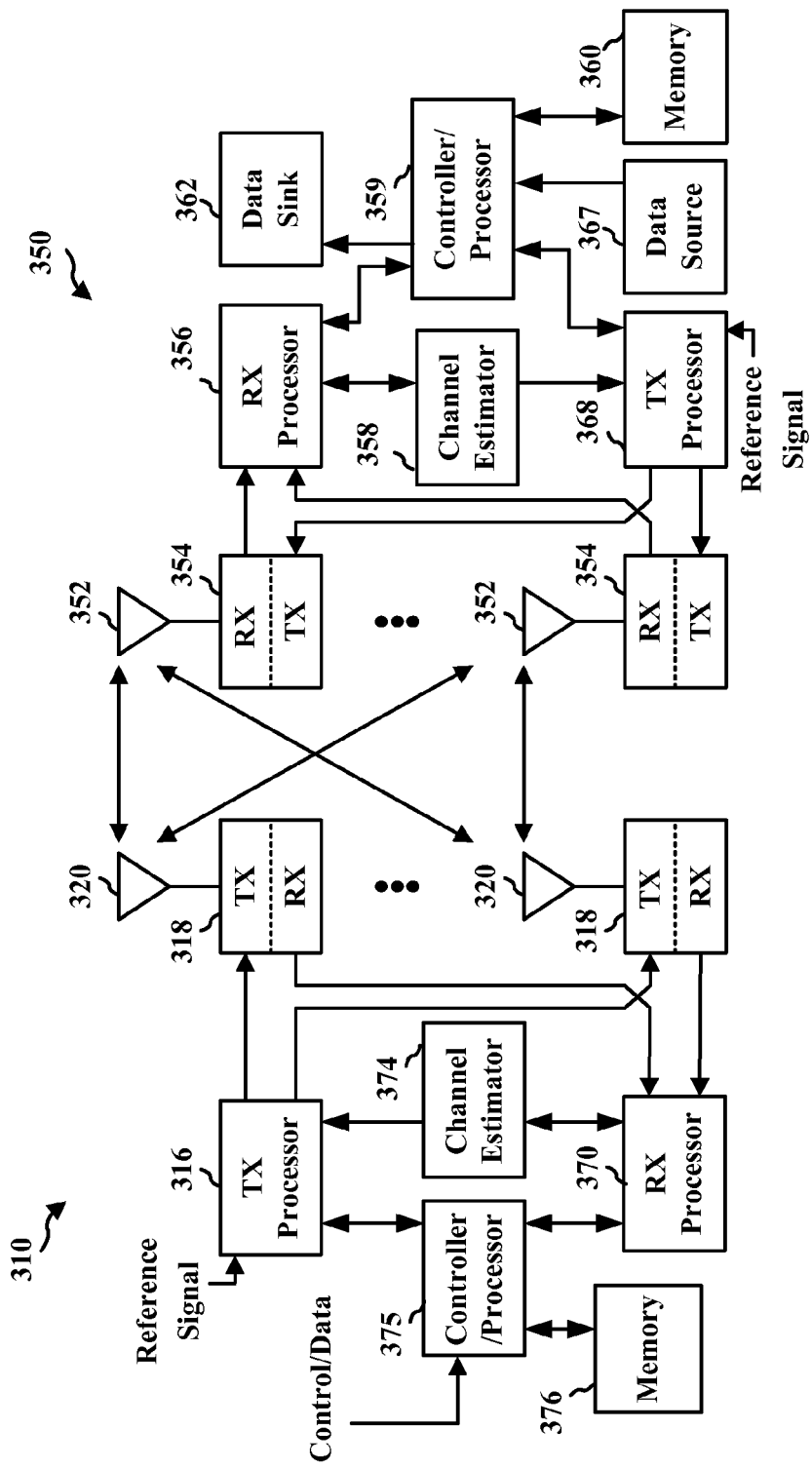
FIG. 3 is a diagram illustrating an example of an evolved Node B and user equipment in an access network.

FIG. 3 is a block diagram of a base station 310 in communication with a UE 350 in an access network. The base station 310 may be, for example, an eNB of a LTE system, a connection point (CP)/access point/base station of a millimeter wave (mmW) system, an eNB capable of communicating signals via the LTE system and the mmW system, or a connection point (CP)/access point/base station capable of communicating signals via the LTE system and the mmW system. The UE 350 may be capable of communicating signals via the LTE system and/or the mmW system. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354 RX receives a signal through its respective antenna 352. Each receiver 354 RX recovers information modulated onto an RF carrier and provides the information to receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359.

The controller/processor 359 can be associated with a memory 360 that stores program codes and data. The memory 360 may be referred to as a computer-readable medium. In the DL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the base station 310, the controller/processor 359 provides header compression, ciphering, packet segmentation and reordering, and multiplexing between logical and transport channels based on radio resource allocations by the base station 310. The controller/processor 359 is also responsible for HARQ operations, retransmission of lost packets, and signaling to the base station 310.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Figure 4:
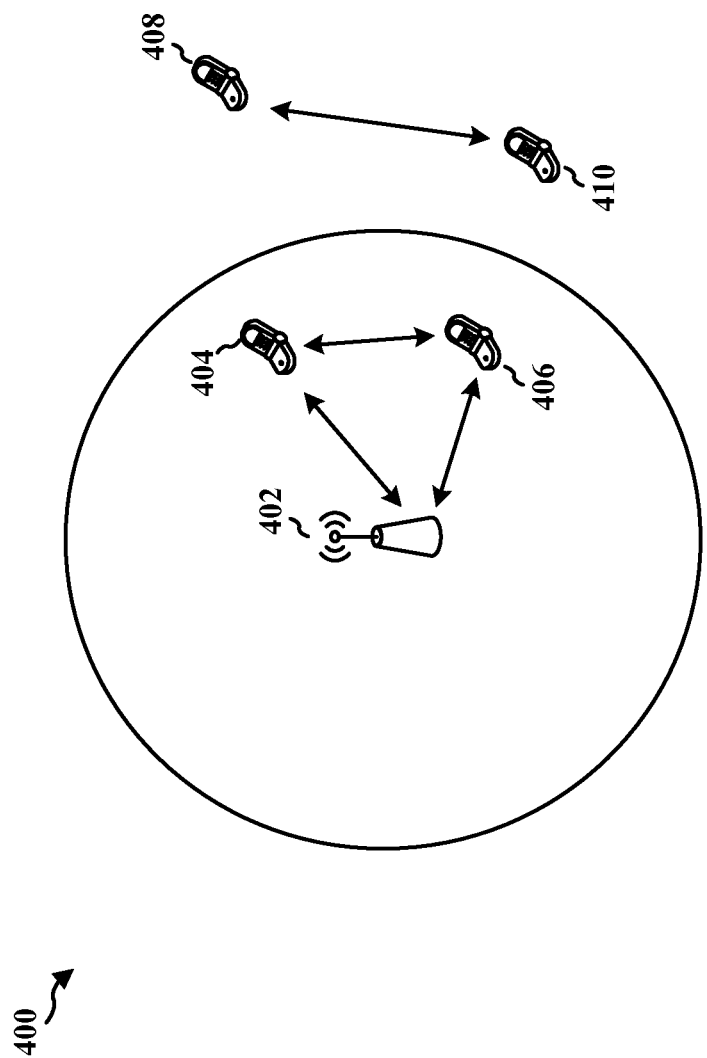
FIG. 4 is a diagram of a device-to-device communications system.

FIG. 4 is a diagram of a device-to-device communications system 400. The device-to-device communications system 400 includes a plurality of wireless devices 404, 406, 408, 410. The device-to-device communications system 400 may overlap with a cellular communications system, such as for example, a wireless wide area network (WWAN). Some of the wireless devices 404, 406, 408, 410 may communicate together in device-to-device communication using the DL/UL WWAN spectrum, some may communicate with the base station 402, and some may do both. For example, as shown in FIG. 4, the wireless devices 408, 410 are in device-to-device communication and the wireless devices 404, 406 are in device-to-device communication. The wireless devices 404, 406 are also communicating with the base station 402.

The exemplary methods and apparatuses discussed infra are applicable to any of a variety of wireless device-to-device communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

An mmW communication system may operate at very high frequency bands (e.g., 10.0 GHz to 300.0 GHz) where the carrier wavelength is on the order of a few millimeters. An mmW system may operate with the help of a number of antennas and beamforming to overcome a channel having low gain. For example, heavy attenuation at high carrier frequency bands may limit the range of a transmitted signal to a few tens of meters (e.g., 1 to 50 meters). Also, the presence of obstacles (e.g., walls, furniture, people, etc.) may block the propagation of high frequency millimeter waves. As such, propagation characteristics of high carrier frequencies necessitate the need for directional beamforming between the mmW-BS and the UE that focuses the transmit energy in specific spatial directions corresponding to the dominant spatial scatterers, reflectors, and/or diffraction paths to overcome the loss. Beamforming may be implemented via an array of antennas (e.g., phased arrays) cooperating to beamform a high frequency signal in a particular direction to receiving devices, and therefore, extend the range of the signal. While an mmW system may operate in a stand-alone fashion, the mmW system may be implemented in conjunction with the more established lower frequency (and lower bandwidth) systems, such as LTE.

In an aspect, the specific directions of beams transmitted in an mmW system may need to be determined reliably and with minimal latency. Moreover, the spatial directions may need to be maintained and/or tracked as a UE moves relative to the mmW-BS and the dominant scatterers. Arbitrary rotations of the UE (e.g., rotations of the UE by the hand of the user) and signal blocking at the UE (e.g., caused by the hand of the user covering portions of the UE) over time may require reorientation via beamforming to avoid link failure with the mmW-BS. It should be noted that such issues are typically not a concern in LTE and other wireless communications standards because the propagation and blocking losses are negligible and performance does not generally rely on the success of the beamforming scheme (reaping the array gain from across a large number of antennas). In certain aspects, higher rank schemes that benefit from spatial diversity are often used to maximize the rate in LTE, however, such schemes are difficult to implement in mmW systems due to radio frequency (RF) complexity and cost constraints.

In an aspect, an mmW-BS and a UE in an mmW system may have different capabilities (also referred to as asymmetric capabilities). For example, the mmW-BS and the UE may have a different number of antennas, a different number of antenna sub-arrays, different types of sub-arrays (linear, planar, etc.), different beamformer architecture types (e.g., digital, analog/RF, hybrid), and/or different transmit power. As discussed infra, such differences in capabilities between the mmW-BS and the UE may be leveraged to efficiently implement a beam tracking (also referred to as a beam scanning) procedure.

In another aspect, a first UE (e.g., wireless device 404) and a second UE (e.g., wireless device 406) may be configured for device-to-device communications in an mmW system and may have different capabilities. For example, the first UE and the second UE may have a different number of antennas, a different number of antenna sub-arrays, different types of sub-arrays (linear, planar, etc.), different beamformer architecture types (e.g., digital, analog/RF, hybrid), and/or different transmit power. Such differences in capabilities between the first UE and second UE may be leveraged to efficiently implement a beam tracking procedure between the first and second UEs.

Figure 5:
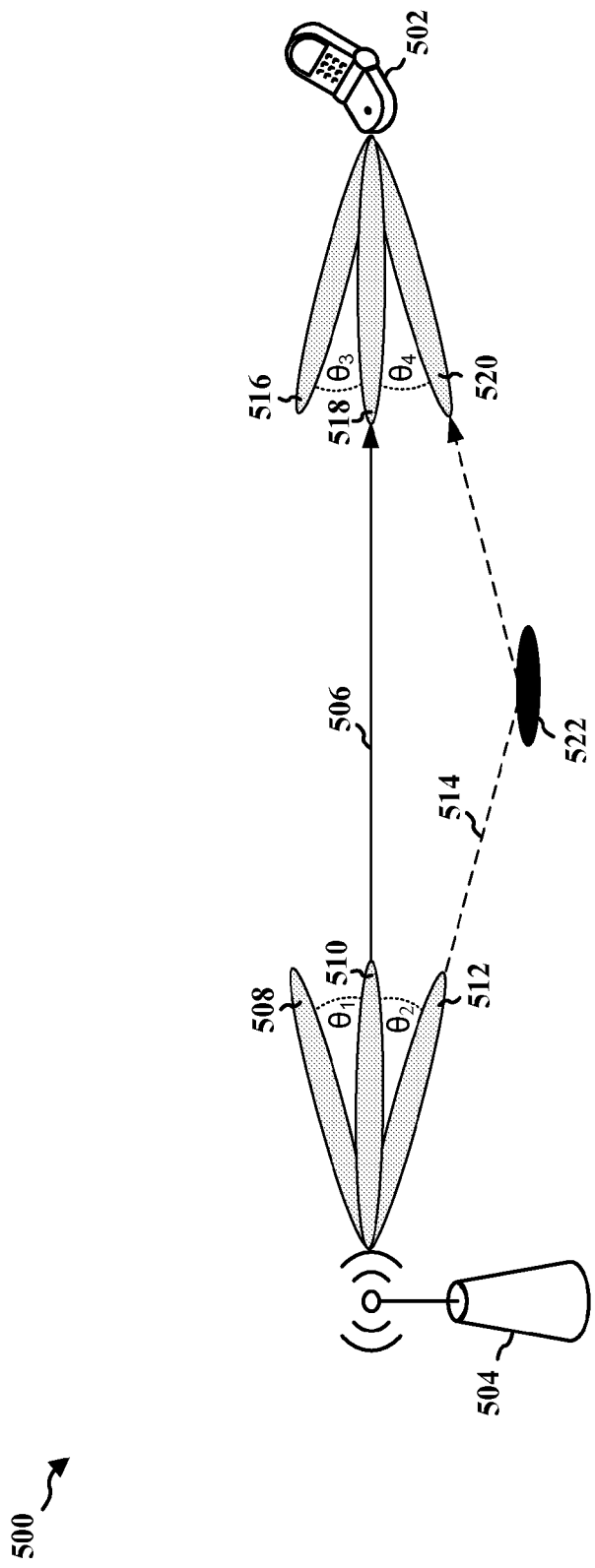
FIG. 5 is a diagram illustrating an example of an mmW wireless communication system.

FIG. 5 is a diagram illustrating an example of an mmW communication system 500. The mmW communication system 500 includes UE 502 and mmW-BS 504. In an aspect, the UE 502 and mmW-BS 504 may perform initial synchronization and discovery to establish a communication link. For example, the UE 502 and the mmW-BS 504 may establish a communication link along path 506. After performing the initial synchronization and discovery, the UE 502 and the mmW-BS 504 may each have an estimate of an L number of directions (also referred to as beamforming directions or angles) corresponding to L dominant paths from the mmW-BS 504 to the UE 502. In an aspect, L is an integer greater than 1 (for diversity reasons). In an aspect, the mmW-BS 504 and/or the UE 502 may have an estimate of the relative strength of these L dominant paths allowing initial beamforming to be performed on the most dominant path.

In an aspect, the remaining L−1 dominant paths are tracked at both the UE 502 and the mmW-BS 504 to ensure smooth switching from the most dominant path (e.g., path 506) of the L dominant paths to any of the remaining L−1 other paths (e.g., path 514 reflecting off of surface 522) if and when such a need arises. For example, such a need to switch from the most dominant path to any of the remaining L−1 paths may arise in a case where the most dominant path is unexpectedly blocked by an obstruction (due to the mobility of the UE 502) or if the material properties (of reflectors and scatterers) change as a function of angles.

In an aspect, the UE 502 and/or the mmW-BS 504 may have one or more beamforming capabilities that may facilitate tracking (also referred to as scanning) of the previously discussed L−1 dominant paths and their respective strengths. In an aspect, the beamforming capability may be that one device in the mmW communication system 500 has a greater number of antennas than another device in the mmW communication system 500. For example, the mmW-BS 504 may have a greater number of antennas than the UE 502. This differential in the number of antennas between the mmW-BS 504 and the UE 502 may allow the mmW-BS 504 to scan through more directions and/or sectors within a time slot than the UE 502 for purposes of learning the respective direction of beams. For example, the mmW-BS 504 may use its greater number of antennas to scan each of its possible beamforming angles (e.g., the angles corresponding to beams 508, 510, and/or 512) more rapidly than the UE 502 can scan each of its possible beamforming angles (e.g., the angles corresponding to beams 516, 518, and/or 520) in a given time slot.

In an aspect, the beamforming capability may be an analog beamforming capability. For example, the mmW-BS 504 may have analog beamforming capability that may allow the mmW-BS 504 to transmit a single beam (e.g., beam 510 along path 506) through one available RF chain at a time. The term RF chain refers to a combination of power amplifier, digital to analog converter, and a mixer when referring to the transmit side of a modem or to a combination of a low noise amplifier, demixer, and an analog to digital converter when referring to the receiver side of a modem. In an aspect, the beamforming capability may be a digital beamforming capability. For example, the mmW-BS 504 may have digital beamforming capability, corresponding to the same number of RF chains as the number of antennas, that may allow the mmW-BS 504 to concurrently transmit multiple beams (e.g., beams 508, 510, and/or 512) by emitting electromagnetic energy in multiple directions at the expense of peak gain. In an aspect, the beamforming capability may be a hybrid beamforming capability with the number of RF chains being more than one and less than the number of antennas. For example, the mmW-BS 504 may have hybrid beamforming capability that may allow the mmW-BS 504 to transmit a beam from each of the RF chains of the mmW-BS 504. In an aspect, the beamforming capability may be an availability of multiple antenna sub-arrays. For example, the UE 502 may have multiple antenna sub-arrays that allows the UE 502 to transmit beams from each of the antenna sub-arrays in different directions (e.g., the respective directions of beams 516, 518, and 520) to overcome RF obstructions, such as a hand of the user of the UE inadvertently blocking a path of a beam.

In another aspect, the beamforming capability may be that one device in the mmW communication system 500 has a higher antenna switching speed than another device in the mmW communication system 500. For example, the mmW-BS 504 may have a higher antenna switching speed than the UE 502. In such example, the higher antenna switching speed of the mmW-BS 504 may be leveraged by configuring the mmW-BS 504 to scan different directions and/or sectors while the UE transmits a beam in a fixed direction. In another example, the UE 502 may have a higher antenna switching speed than the mmW-BS 504. In such example, the higher antenna switching speed of the UE 502 may be leveraged by configuring the UE 502 to scan different directions and/or sectors while the mmW-BS 504 transmits a beam in a fixed direction.

Beam tracking is typically performed by the UE 502 and/or the mmW-BS 504 after an initial synchronization and discovery phase, where an initial estimate of the angles of beams has already been obtained by the UE 502 and/or the mmW-BS 504. Therefore, it should be noted that the initial discovery phase is characterized by poor signal-to-noise ratio (SNR) conditions, whereas beam tracking is characterized by reasonable link margin/SNR.

Beam tracking algorithms typically use the angles learned in the initial synchronization and discovery period as an initial value (also referred to as a seed value) and to subsequently fine tune these angles within a narrow range over a period of time in which the dynamic range of the angles is small. For example, if the UE 502 is traveling at 100 mph and the distance between the UE 502 and the mmW-BS 504 is 100 m, the angle of a path (e.g., path 506) from the mmW-BS 504 to the UE 502 may change on the order of 2.5 degrees every 100.0 milliseconds (ms). In such example, when the UE 502 is tracking the path 506 in the direction of beam 518, the UE 502 may search in a narrow range (e.g., an angle range T that includes angles $\theta_3$ and $\theta_4$ with respect to the angle of beam 518 in FIG. 5) around its initialized angle to arrive at the best angle estimate for the tracking phase. For example, $\theta_3$ may be the seed value +2.0 degrees and $\theta_4$ may be the seed value −2.0 degrees. Therefore, the speed of the tracking procedure may be considerably increased by exploiting the asymmetric capabilities at the mmW-BS 504 and the UE 502.

In an aspect, the mmW-BS 504 may have a digital beamforming capability with NK number of RF chains and the UE 502 may have either one RF chain (e.g., the UE 502 has a single analog or RF beamformer) or at most two RF chains (e.g., the UE 502 has a hybrid beamformer). The presence of multiple RF chains may reduce the time necessary for beam tracking by a factor of the number of multiple RF chains, since multiple directions may be searched at the same time using these RF chains. For example, when the mmW-BS 504 has digital beamforming capability with at least two RF chains, the mmW-BS 504 may simultaneously transmit a beam along the initialized direction for a $K^{th}$ path, such as path 506, and an $I^{th}$ path, such as path 514, (where K≠I) in one time slot. The UE 502 may configure its antenna to cycle through its possible directions one at a time to determine the best path for each pair of paths (e.g., the $K^{th}$ and $I^{th}$ paths).

In an aspect, the UE 502 may have multiple antenna sub-arrays. The multiple antenna sub-arrays of the UE 502 may ensure signaling diversity to overcome dynamic signaling impairments, such as a physical obstruction of a signal path. For example, such a physical obstruction may be a hand or a part of the body of a user blocking a signal path. In such aspect, with the mmW-BS 504 beamforming along a single direction, the UE 502 may use each of its antenna sub-arrays to check for a received signal quality from a different direction, thereby speeding up the tracking process by the number of available antenna sub-arrays of the UE 502. For example, when the UE 502 has at least two antenna sub-arrays, the mmW-BS 504 may fix its beamformer to that of the initialized direction for the $I^{th}$ path 514 while the UE 502 cycles through its antenna sub-arrays in different directions (e.g., directions of beams 516, 518, and/or 520) to determine the best direction (e.g., the direction of beam 520) for the $I^{th}$ path 514 in reduced tracking time with respect to a case where the UE 502 has no antenna sub-arrays.

In an aspect, when the mmW-BS 504 has digital beamforming capability and the UE 502 has multiple antenna sub-arrays, the mmW-BS 504 and the UE 502 may simultaneously employ these capabilities to significantly increase the speed of the tracking procedure performed by the mmW-BS 504 and the UE 502. For example, the mmW-BS 504 may transmit a beam along the initialized direction for the $K^{th}$ path and the $I^{th}$ path (where K≠I), and the UE 502 may cycle through its antenna sub-arrays in different directions to determine the best direction for either path in reduced tracking time. In another aspect, and as discussed infra with respect to FIG. 7, when the UE 502 has digital or hybrid beamforming capability, the UE 502 may employ the digital or hybrid beamforming capability to significantly increase the speed of the tracking procedure.

Figure 6:
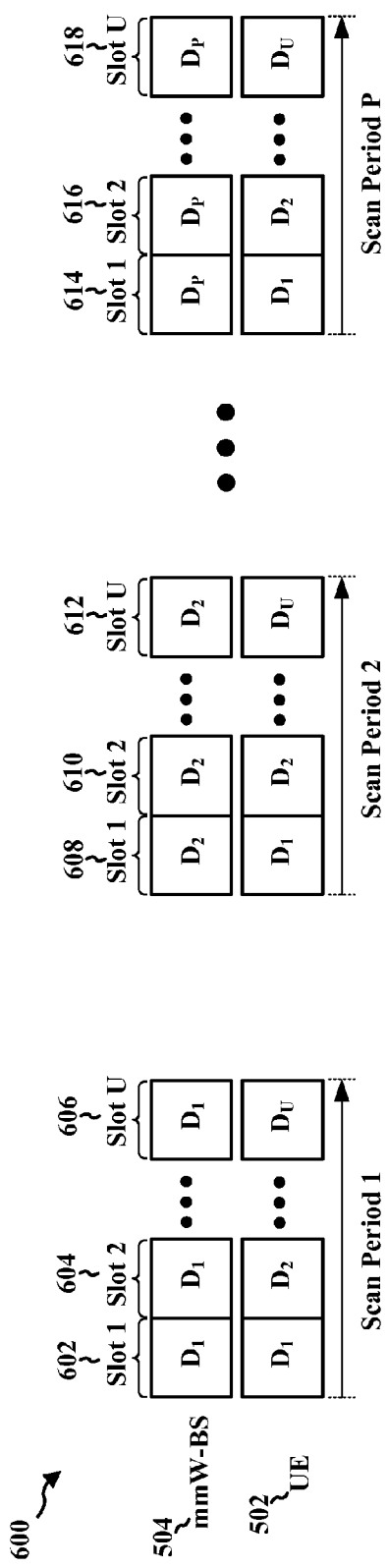
FIG. 6 is a diagram illustrating an example scanning operation for a UE and an mmW-BS.

FIG. 6 is a diagram illustrating an example frame structure 600 for a scanning operation for the UE 502 and the mmW-BS 504. In the aspect of FIG. 6, the UE 502 and the mmW-BS 504 may each have a single antenna. As shown in FIG. 6, the mmW-BS 504 may transmit a beam in a single direction (e.g., direction "$D_1$") during each of a number of time slots (e.g., slot 1 602, slot 2 604, slot U 606). As further shown in FIG. 6, the UE 502 may scan each of its U number of possible directions (e.g., directions "$D_1$" to "$D_U$") during each of the corresponding time slots (e.g., slot 1 602, slot 2 604, slot U 606) to determine the best path for the beam from the mmW-BS 504. For example, each of the time slots (e.g., slot 1 602, slot 2 604, slot U 606) may have the same duration. In such example, the duration of scan period 1 in FIG. 6 may be equivalent to the total of the U time slots required for the UE 502 to scan each of its U directions.

The mmW-BS 504 may subsequently transmit a beam in another direction (e.g., direction "$D_2$") while the UE 502 scans each of its U number of possible directions to determine the best path for the beam from the mmW-BS 504. As shown in FIG. 6, the mmW-BS 504 may transmit a beam in a single direction (e.g., direction "$D_2$") during each of a number of time slots (e.g., slot 1 608, slot 2 610, slot U 612). As further shown in FIG. 6, the UE 502 may scan each of its U number of possible directions (e.g., directions "$D_1$" to "$D_U$") during each of the corresponding time slots (e.g., slot 1 608, slot 2 610, slot U 612) to determine the best path for the beam from the mmW-BS 504. For example, each of the time slots (e.g., slot 1 608, slot 2 610, slot U 612) may have the same duration. In such example, the duration of scan period 2 in FIG. 6 may be equivalent to the total of the U time slots required for the UE 502 to scan each of its U directions.

The mmW-BS 504 may transmit beams in the last direction of its P number of possible directions in a manner similar to the transmissions previously discussed with respect to the scan periods 1 and 2 in FIG. 6. For example, the mmW-BS 504 may transmit a beam in the last of its possible directions (e.g., direction "$D_1$") during each of the corresponding time slots (e.g., slot 1 614, slot 2 616, slot U 618). As further shown in FIG. 6, the UE 502 may scan each of its U number of possible directions (e.g., directions "$D_1$" to "$D_U$") during each of the corresponding time slots (e.g., slot 1 614, slot 2 616, slot U 618) to determine the best path for the beam from the mmW-BS 504. For example, each of the time slots (e.g., slot 1 614, slot 2 616, slot U 618) may have the same duration. In such example, the duration of scan period P in FIG. 6 may be equivalent to the total of the U time slots required for the UE 502 to scan each of its U directions.

Figure 7:
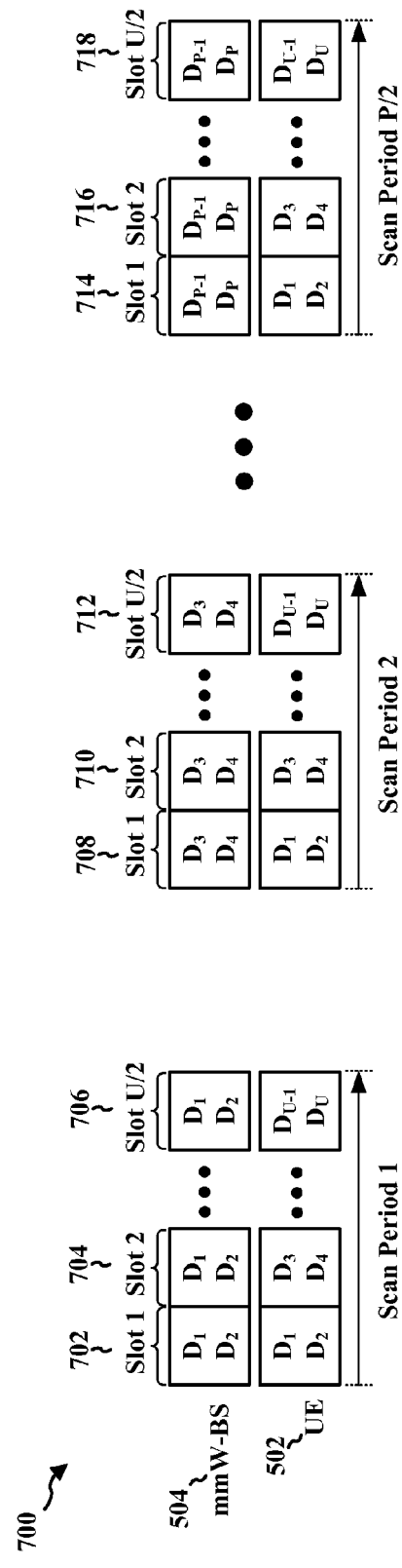
FIG. 7 is a diagram illustrating an example scanning operation for a UE and an mmW-BS.

FIG. 7 is a frame structure 700 illustrating an example scanning operation for the UE 502 and the mmW-BS 504. In the configuration of FIG. 7, the UE 502 may have multiple antenna sub-arrays and the mmW-BS 504 may have digital beamforming capability. As shown in FIG. 7, the mmW-BS 504 may transmit beams in a P number of possible directions (e.g., directions "$D_1$" to "$D_P$") by concurrently transmitting two beams in two different directions (e.g., a first beam in direction "$D_1$" and a second beam in direction "$D_2$") during each of the corresponding time slots (e.g., slot 1 702, slot 2 704, slot U/2 706) of a scan period. As further shown in FIG. 7, the UE 502 may scan two different directions (e.g., direction "$D_1$" and direction "$D_2$" in a first time slot, direction "$D_3$" and direction "$D_4$" in a second time slot, and so on) of its U number of possible directions during each of the corresponding time slots (e.g., slot 1 702, slot 2 704, slot U/2 706) to determine the best path for the beams from the mmW-BS 504. For example, each of the time slots may have the same duration. In such example, the duration of scan period 1 in FIG. 7 may be equivalent to the total of the U/2 time slots required for the mmW-BS 504 to transmit beams for each of its P directions.

As further shown in FIG. 7, the mmW-BS 504 may concurrently transmit two beams in two different directions (e.g., a first beam in direction "$D_3$" and a second beam in direction "$D_4$") during each of the corresponding time slots (e.g., slot 1 708, slot 2 710, slot U/2 712). As further shown in FIG. 7, the UE 502 may scan two different directions (e.g., direction "$D_1$" and direction "$D_2$" in a first time slot, direction "$D_3$" and direction "$D_4$" in a second time slot, and so on) of its U number of possible directions during each of the corresponding time slots (e.g., slot 1 708, slot 2 710, slot U/2 712) to determine the best path for the beams from the mmW-BS 504.

For example, each of the time slots may have the same duration. In such example, the duration of scan period 2 in FIG. 7 may be equivalent to the total of the U/2 time slots required for the mmW-BS 504 to transmit beams for each of its P directions.

As shown in FIG. 7, the mmW-BS 504 may transmit beams in the last two directions of its P number of possible directions by concurrently transmitting two beams in two different directions (e.g., a first beam in direction "$D_{P-1}$" and a second beam in direction "$D_P$") during each of the corresponding time slots (e.g., slot 1 714, slot 2 716, slot U/2 718). As further shown in FIG. 7, the UE 502 may scan two different directions (e.g., direction "$D_1$" and direction "$D_2$" in a first time slot, direction "$D_3$" and direction "$D_4$" in a second time slot, and so on) of its U number of possible directions during each of the corresponding time slots (e.g., slot 1 714, slot 2 716, slot U/2 718) to determine the best path for the beams from the mmW-BS 504. For example, each of the time slots may have the same duration. In such example, the duration of scan period P/2 in FIG. 7 may be equivalent to the total of the U/2 time slots required for the UE 502 to scan each of its U directions.

It should be understood that in the aspect of FIG. 6, the UE 502 and mmW-BS 504 are equipped with only one antenna and that no capabilities of the UE 502 and the mmW-BS 504 are being leveraged. As such, in one example, when the mmW-BS 504 equipped with one antenna transmits beams in four possible directions (e.g., U=4), four scan periods (one scan period per direction) would be required to cover all four directions (e.g., directions "$D_1$" to "$D_4$") of the mmW-BS 504. In the aspect of FIG. 7, however, the UE 502 may receive beamforming capability information associated with the mmW-BS and may modify the scanning operation to leverage one or more of the capabilities indicated in the beamforming capability information. For example, the beamforming capability information may indicate that the mmW-BS 504 has digital beamforming capability and, therefore, may transmit two or more beams in different directions in a single time slot. Since the UE 502 is informed of such digital beamforming capability of the mmW-BS via the received capability information, the UE 502 may determine that multiple beams may be transmitted by the mmW-BS 504 in different directions in a single time slot. Accordingly, the UE 502 may implement its two antenna sub-arrays to concurrently scan for beams in two different directions in a time slot to significantly increase the speed of the scanning operation.

For example, in the aspect of FIG. 7, when the mmW-BS 504 transmits beams in four possible directions (e.g., U=4), two scan periods (one scan period per two directions) would be required to cover all four directions (e.g., directions "$D_1$" to "$D_4$") of the mmW-BS 504. Therefore, if the time slots in FIGS. 6 and 7 are configured to be equal in duration, the scanning operation in the aspect of FIG. 7 will require half the number of scanning periods with half the number of time slots per scan period as required in the aspect of FIG. 6 for the UE 502 to scan all possible directions of the mmW-BS 504.

In an aspect, the UE 502 may send beamforming capability information associated with the UE 502 to the mmW-BS 504. For example, the beamforming capability information may indicate that the UE 502 has two antenna sub-arrays and, therefore, may scan for beams in two different directions in a single time slot. Accordingly, the mmW-BS 504 having digital beamforming capability may transmit two beams having different directions in each time slot as shown in FIG. 7, thereby leveraging the digital beamforming capability to significantly increase the speed of the scanning operation.

It should be understood that the aspects disclosed in FIGS. 6 and 7, where the mmW-BS 504 is configured to transmit beams and the UE 502 is configured to scan for beams, represent example configurations. In other aspects, the UE 502 may be configured to transmit beams and the mmW-BS 504 may be configured to scan for beams in a manner similar to the scanning operations described supra with respect to FIGS. 6 and 7.

Figure 8:
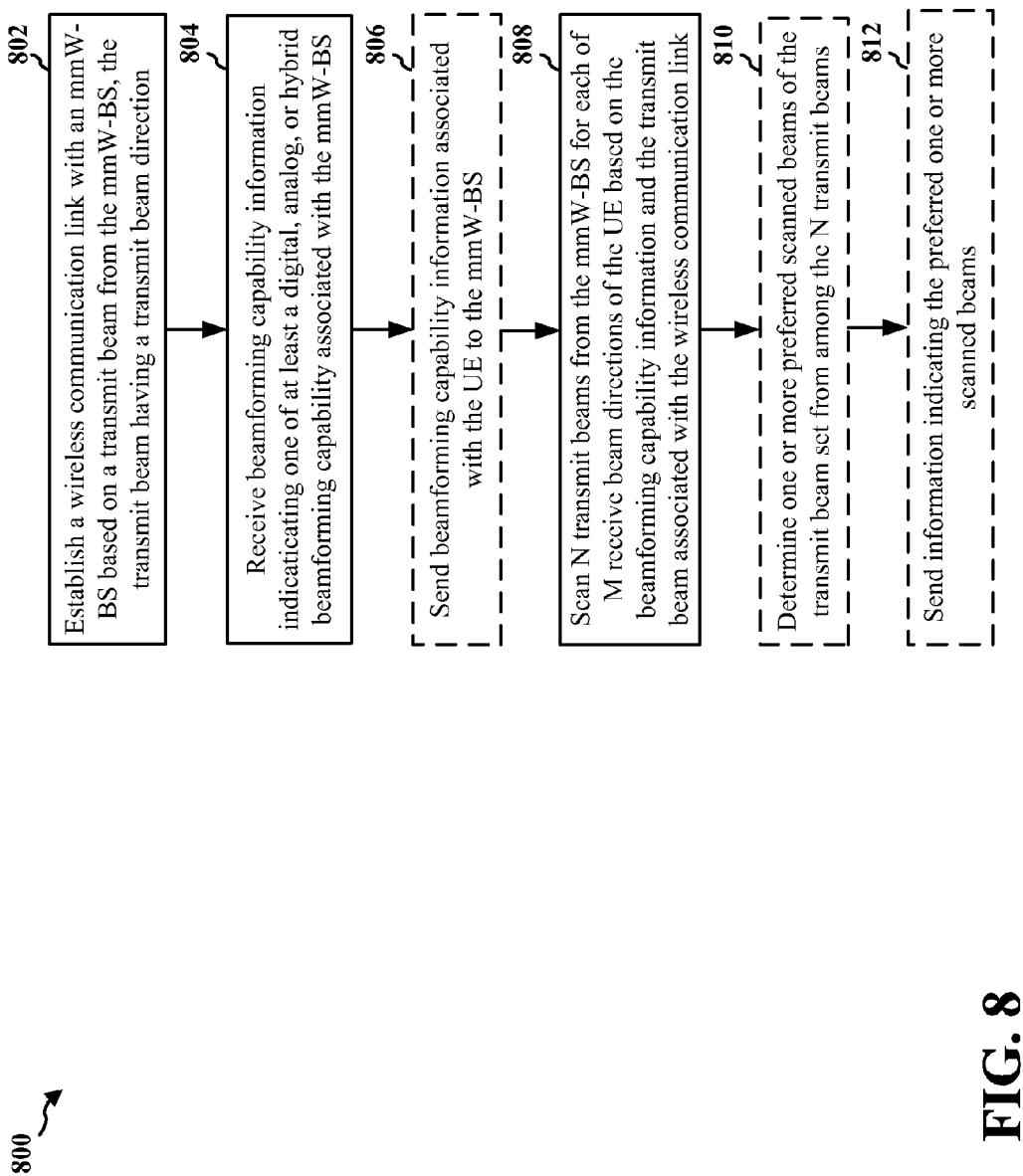
FIG. 8 is a flow chart of a method of wireless communication

FIG. 8 is a flow chart 800 of a method of wireless communication. The method may be performed by a UE (e.g., the UE 502, the apparatus 902/902'). It should be noted that the blocks indicated with dotted lines in FIG. 8 (e.g., blocks 806, 810, and 812) represent optional blocks.

At block 802, the UE establishes a wireless communication link with an mmW-BS based on a transmit beam from the mmW-BS, the transmit beam having a transmit beam direction. For example, the UE 502 may establish a wireless communication link with the mmW-BS 504 based on the transmit beam 510 along path 506.

At block 804, the UE receives beamforming capability information indicating one of at least a digital, analog, or hybrid beamforming capability associated with the mmW-BS. In another aspect, the beamforming capability information indicates an antenna switching speed of the mmW-BS.

At block 806, the UE sends beamforming capability information associated with the UE to the mmW-BS. In an aspect, the UE 502 may send beamforming capability information indicating a digital, analog, or hybrid beamforming capability. In another aspect, the beamforming capability information associated with the UE indicates that the UE includes multiple antenna sub-arrays. In another aspect, the beamforming capability information associated with the UE indicates an antenna switching speed of the UE.

At block 808, the UE scans N transmit beams from the mmW-BS for each of M receive beam directions of the UE based on the beamforming capability information and the transmit beam associated with the wireless communication link. In an aspect, the UE scans the N transmit beams by using multiple antenna sub-arrays in a single time slot. In an aspect, the UE scans the N transmit beams by configuring antenna weights and/or a phase and amplitude for the N transmit beam directions. In an aspect, the N transmit beams includes N transmit beam directions within an angle range T of the transmit beam direction of the wireless communication link. In an aspect, the scanning is further based on the beamforming capability information associated with the UE.

At block 810, the UE determines one or more preferred scanned beams of the transmit beam set from among the N transmit beams. In an aspect, the determination is performed by the UE by comparing a signal quality of the scanned beams to a threshold and selecting one or more beams that meet or exceed the threshold.

Finally, at block 812, the UE sends information indicating the preferred one or more scanned beams.

Figure 9:
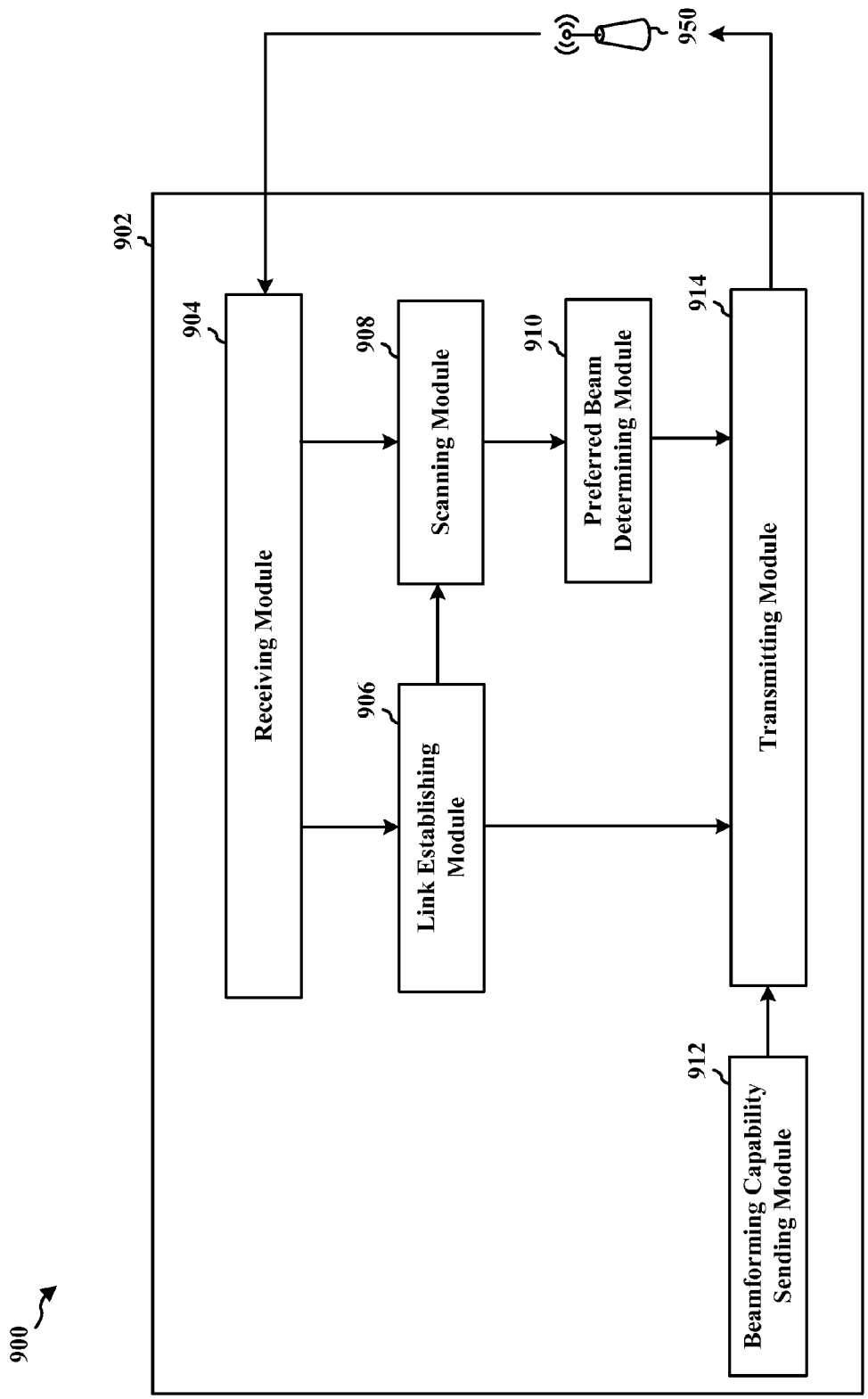
FIG. 9 is a data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a UE. The apparatus includes a module 904 that receives beamforming capability information indicating one of at least a digital, analog, or hybrid beamforming capability associated with the mmW-BS (e.g., mmW-BS 950), a module 906 that establishes a wireless communication link with an mmW-BS based on a transmit beam from the mmW-BS, the transmit beam having a transmit beam direction, a module 908 that scans N transmit beams from the mmW-BS for each of M receive beam directions of the UE based on the beamforming capability information and the transmit beam associated with the wireless communication link, a module 910 that determines one or more preferred scanned beams of the transmit beam set from among the N transmit beams, a module 912 that sends beamforming capability information (via the transmitting module 914) associated with the UE to the mmW-BS 950, and a module 914 that sends information indicating the preferred one or more scanned beams.

The apparatus may include additional modules that perform each of the blocks in the aforementioned flow chart of FIG. 8. As such, each block in the aforementioned flow chart of FIG. 8 may be performed by a module and the apparatus may include one or more of those modules. The modules may be one or more hardware components specifically configured to carry out the stated processes implemented by a processor configured to perform the stated processes, stored within a computer-readable medium for implementation by a processor, or some combination thereof.

Figure 10:
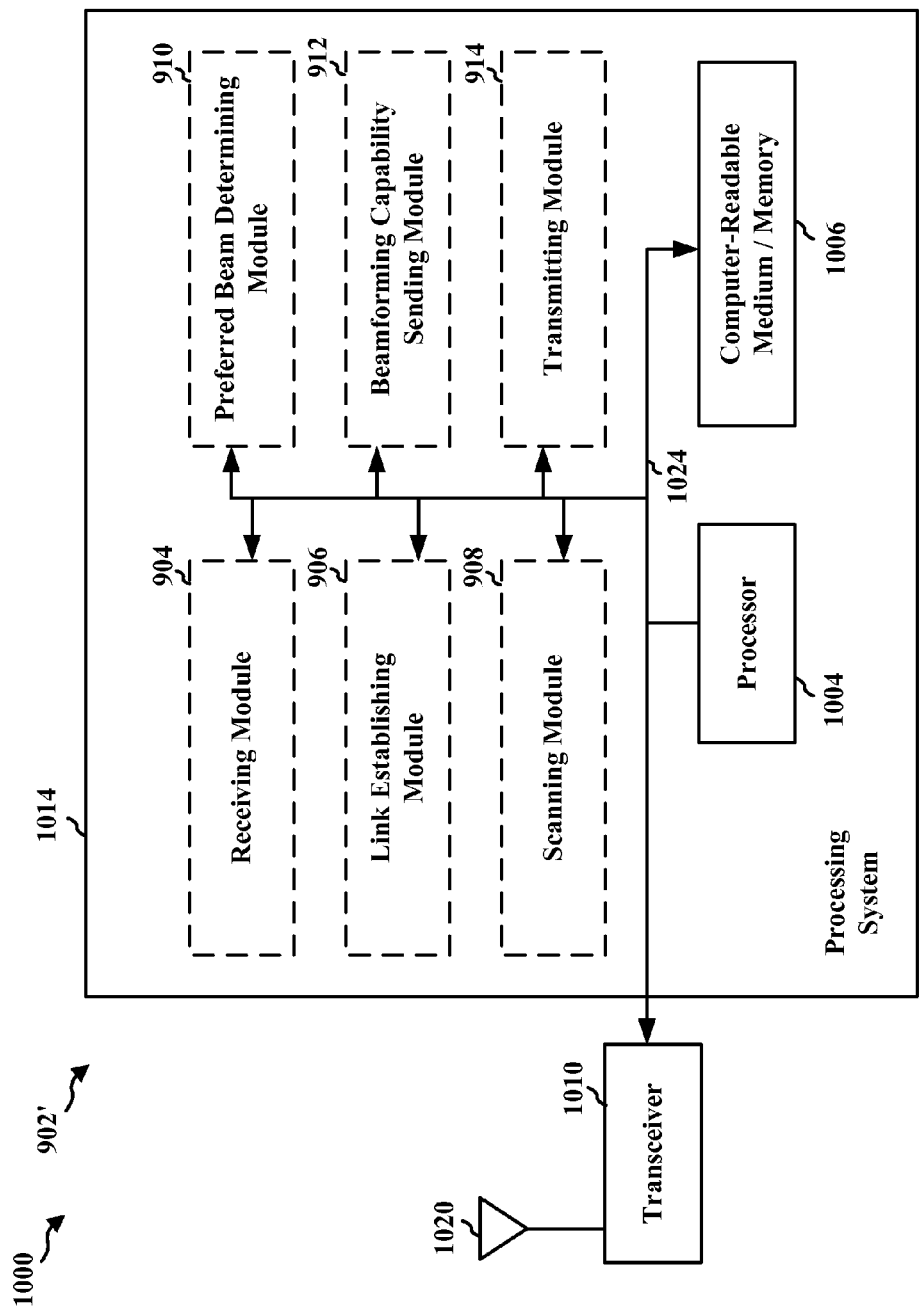
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912, and 914, and the computer-readable medium/memory 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The transceiver 1010 receives a signal from the one or more antennas 1020, extracts information from the received signal, and provides the extracted information to the processing system 1014, specifically the receiving module 904. In addition, the transceiver 1010 receives information from the processing system 1014, specifically the transmitting module 914, and based on the received information, generates a signal to be applied to the one or more antennas 1020. The processing system 1014 includes a processor 1004 coupled to a computer-readable medium/memory 1006. The processor 1004 is responsible for general processing, including the execution of software stored on the computer-readable medium/memory 1006. The software, when executed by the processor 1004, causes the processing system 1014 to perform the various functions described supra for any particular apparatus. The computer-readable medium/memory 1006 may also be used for storing data that is manipulated by the processor 1004 when executing software. The processing system further includes at least one of the modules 904, 906, 908, 910, 912, and 914. The modules may be software modules running in the processor 1004, resident/stored in the computer readable medium/memory 1006, one or more hardware modules coupled to the processor 1004, or some combination thereof. The processing system 1014 may be a component of the UE 350 and may include the memory 360 and/or at least one of the TX processor 368, the RX processor 356, and the controller/processor 359.

In one configuration, the apparatus 902/902' for wireless communication includes means for establishing a wireless communication link with an mmW-BS based on a transmit beam from the mmW-BS, the transmit beam having a transmit beam direction, means for receiving beamforming capability information indicating one of at least a digital, analog, or hybrid beamforming capability associated with the mmW-BS, means for scanning N transmit beams from the mmW-BS for each of M receive beam directions of the UE based on the beamforming capability information and the transmit beam associated with the wireless communication link, means for determining one or more preferred scanned beams of the transmit beam set from among the N transmit beams, means for sending information indicating the preferred one or more scanned beams, means for sending beamforming capability information associated with the UE to the mmW-BS. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication for a user equipment (UE), comprising:
   establishing a wireless communication link with a millimeter-wave base station (mmW-BS) based on a transmit beam from the mmW-BS, the transmit beam having a transmit beam direction;
   receiving beamforming capability information indicating one of at least a digital, analog, or hybrid beamforming capability associated with the mmW-BS, wherein the beamforming capability information includes an indication of an antenna switching speed of the mmW-BS; and
   scanning N transmit beams from the mmW-BS for each of M receive beam directions of the UE based on the beamforming capability information and the transmit beam associated with the wireless communication link.

2. The method of claim 1, further comprising:
   determining one or more preferred scanned beams of a transmit beam set from among the N transmit beams; and
   sending information indicating the preferred one or more scanned beams.

3. The method of claim I, further comprising sending beamforming capability information associated with the UE to the mmW-BS, wherein the scanning is further based on the beamforming capability information associated With the UE.

4. The method of claim 3, wherein:
   the beamforming capability information associated with the UE indicates that the UE comprises a plurality of antenna sub-arrays, and
   the scanning of the N transmit beams comprises scanning the N transmit beams using the plurality of antenna sub-arrays in a single time slot.

5. The method of claim 1, wherein the N transmit beams comprise N transmit beam directions within an angle range T of the transmit beam direction.

6. The method of claim 5, whe in the scanning comprises configuring antenna weights and/or a phase and amplitude for the N transmit beam directions.

7. The method of claim 2, wherein the determining comprises comparing a signal quality of the scanned beams to a threshold.

8. A user equipment (UE) apparatus for wireless communication, comprising:
   means for establishing a wireless communication link with a millimeter-wave base statio (mmW-BS) based on a transmit beam from the mmW-BS, the transmit beam having a transmit beam direction;
   means for receiving beamforming capability information indicating one of at least a digital, analog, or hybrid beamforming capability associated with the mmW-BS, wherein the beamforming capability information includes an indication of an antenna switching speed of the mmW-BS; and
   means for scanning N transmit beams from the mmW-BS for each of M receive beam directions of the UE based on the beamforming capability information and the transmit beam associated with the wireless communication link.

9. The UE of claim 8, further comprising:
   means for determining one or more preferred scanned beams of a transmit beam set from among the N transmit beams; and
   means for sending information indicating the preferred one or more scanned beams.

10. The UE of claim 8, further comprising means for sending beamfonning capability information associated with the UE to the mmW-BS, wherein the scanning is further based on the beamforming capability information associated with the UE.

11. The UE of claim 10, wherein:
   the beamforming capability information associated with the UE indicates that the UE comprises a plurality of antenna sub-arrays, and
   the means for scanning the N transmit beams is configured to scan the N transmit beams using the plurality of antenna sub-arrays in a single time slot.

12. The UE of claim 8, wherein the N transmit beams comprise N transmit beam directions within an angle range T of the transmit beam direction.

13. The UE of claim 12, wherein the means for scanning is configured to configure antenna weights and/or a phase and amplitude for the N transmit beam directions.

14. The UE of claim 9, wherein the means for determining is configured to compare a signal quality of the scanned beams to a threshold.

15. A user equipment (UE) for wireless communication, comprising:
   a memory; and
   at least one processor coupled to the memory and configured to:
      establish a wireless communication link with a millimeter-wave base station (mmW-BS) based on a transmit beam from the mmW-BS, the transmit beam having a transmit beam direction;
      receive beamforming capability information indicating one of at least a digital, analog, or hybrid beamforming capability associated with the mmW-BS, wherein the beam capability information includes an indication of an antenna switching speed of the mmW-BS; and
      scan N transmit beams from the mmW-BS for each of M receive beam directions of the UE based on the beamforming capability information and the transmit beam associated with the wireless communication link.

16. The UE of claim 15, wherein the at least one processor is further configured to:
   determine one or more preferred scanned beams of a transmit beam set from among the N transmit beams; and
   send information indicating the preferred one or more scanned beams.

17. The UE of claim 15, wherein the at least one processor is further configured to send beam capability information associated with the UE to the mmW-BS, wherein the scanning is further based on the beamforming capability information associated with the UE.

18. The UE of claim 17, Wherein:
   the beamforming capability information associated with the UE indicates that the UP comprises a plurality of antenna sub-arrays, and
   the scanning of the N transmit beams comprises scanning the N transmit beams using the plurality; of antenna sub-arrays in a single time slot.

19. The UE of claim 15, wherein the N transmit beams comprise N transmit beam directions within an angle range T of the transmit beam direction.

20. The UP of claim 19, wherein the scanning comprises configuring antenna weights and/or a phase and amplitude for the N transmit beam directions.

21. The UP of claim 16, wherein the determination of the one or more preferred scanned beams comprises comparing a signal quality of the scanned beams to a threshold.

22. A non-transitory computer-readable medium storing computer executable code, comprising code to:

establish a wireless communication link with a millimeter-wave base station (mmW-BS) based on a transmit beam from the mmW-BS, the transmit beam having a transmit beam direction;

receive beamforming capability information indicating one of at least a digital, analog, or hybrid beamforming capability associated with the mmW-BS, wherein the beamforming capability information includes an indication of an antenna switching speed of the mmW-BS; and scan N transmit beams from the mmW-BS for each of M receive beam directions of a user equipment (UE) based on the beamforming capability information and the transmit beam associated with the wireless communication link.

23. The non-transitory computer-readable medium of claim 22, further comprising code to:

determine one or more preferred scanned beams of a transmit beam set from among the N transmit beams; and send information indicating the preferred one or more scanned beams.

24. The non-transitory computer-readable medium of claim 22, further comprising code to send beamforming capability information associated with the UE to the mmW-BS, wherein the scanning is further based on the beamforming capability information associated with the UE.

25. The non-transitory computer-readable medium of claim 24, wherein:

the beamforming capability information associated he UE indicates that UE comprises a plurality of antenna sub-arrays, and the scanning of the N transmit beams comprises scanning the N transmit beams using the plurality of antenna sub-arrays in a single time slot.

26. The non-transitory computer-readable medium of claim 22, wherein the N transmit beams comprise N transmit beam directions within an angle range T of the transmit beam direction.

27. The non-transitory computer-readable medium of claim 26, wherein the scanning comprises configuring antenna weights and/or a phase and amplitude for the N transmit beam directions.

28. The non-transitory computer-readable medium of claim 23, wherein the determining comprises comparing a signal quality of the scanned beams to a threshold.

* * * * *